United States Patent
Battenfelder et al.

(10) Patent No.: US 7,260,498 B2
(45) Date of Patent: Aug. 21, 2007

(54) CONTEXT-SPECIFIC ELECTRONIC PERFORMANCE SUPPORT

(75) Inventors: James C. Battenfelder, Kirkwood, PA (US); Diane E. Harris, Wilmington, DE (US); Maria C. Koroknay, Newark, DE (US); Carolyn D. Franklin, New Castle, DE (US); Clark Quinn, Walnut Creek, CA (US); Jude Stoller, Seattle, WA (US)

(73) Assignee: Dade Behring Inc., Deerfield, IL (US)

( * ) Notice: Subject to any disclaimer, the term of this patent is extended or adjusted under 35 U.S.C. 154(b) by 0 days.

(21) Appl. No.: 11/443,718

(22) Filed: May 31, 2006

(65) Prior Publication Data

US 2006/0288259 A1 Dec. 21, 2006

Related U.S. Application Data

(60) Provisional application No. 60/691,573, filed on Jun. 17, 2005.

(51) Int. Cl.
*G06F 11/30* (2006.01)

(52) U.S. Cl. .................................. 702/182; 702/188

(58) Field of Classification Search ............... 702/182, 702/183, 184, 185, 186, 188; 709/226, 228, 709/229; 714/47; 345/326, 327, 744, 763, 345/765; 434/322
See application file for complete search history.

(56) References Cited

U.S. PATENT DOCUMENTS

| | | | |
|---|---|---|---|
| 5,175,812 A | 12/1992 | Krieger | |
| 5,225,997 A | 7/1993 | Lederer et al. | |
| 5,338,157 A | 8/1994 | Blomquist | |
| 5,577,186 A | 11/1996 | Mann, II et al. | |
| 5,594,663 A | 1/1997 | Messaros et al. | |
| 5,627,958 A | 5/1997 | Potts et al. | |
| 5,782,642 A * | 7/1998 | Goren | 434/307 R |
| 5,976,464 A | 11/1999 | Pourtalet-McSweeny et al. | |
| 6,006,171 A | 12/1999 | Vines et al. | |
| 6,080,364 A | 6/2000 | Mimura et al. | |
| 6,192,325 B1 | 2/2001 | Piety et al. | |
| 6,300,950 B1 | 10/2001 | Clark et al. | |
| 6,308,042 B1 | 10/2001 | Marsh et al. | |
| 6,556,951 B1 | 4/2003 | Deleo et al. | |
| 6,598,011 B1 | 7/2003 | Howards Koritzinsky et al. | |
| 6,675,131 B2 | 1/2004 | Hahn | |
| 6,721,688 B1 | 4/2004 | Clarke | |

(Continued)

*Primary Examiner*—Bryan Bui
(74) *Attorney, Agent, or Firm*—King & Spalding LLP

(57) ABSTRACT

Providing context-specific electronic performance support for a device through just-in-time knowledge transfer. Performance support content comprising information regarding device procedures, device alerts, and display screens for displaying information related to the device can be stored in multiple content files. Each content file can be associated with a device alert, a device procedure, and/or a display screen. Device users can interact with one or more display screens on a display associated with the device. The device users can request performance support content by activating an icon or hyperlink on the display screen(s). A content publisher can identify performance support content responsive to each request from one or more of the content files based on context information related to the display screen(s) on the display at the time of the request. The content publisher can display a display screen comprising the identified information on the display associated with the device.

24 Claims, 16 Drawing Sheets

U.S. PATENT DOCUMENTS

| | | | |
|---|---|---|---|
| 6,816,815 B2 | 11/2004 | Takayama | |
| 6,826,498 B2 | 11/2004 | Birkner et al. | |
| 6,846,457 B1 | 1/2005 | Tokiwa et al. | |
| 6,853,958 B1 | 2/2005 | Turin et al. | |
| 6,856,825 B2 | 2/2005 | Hahn | |
| 6,882,825 B2 | 4/2005 | Hopkins et al. | |
| 6,907,569 B1 | 6/2005 | Craft | |
| 6,909,874 B2 | 6/2005 | Holtz et al. | |
| 6,961,722 B1 * | 11/2005 | Bruecken | 707/3 |
| 7,050,933 B2 | 5/2006 | Parvin et al. | |
| 2002/0049562 A1 | 4/2002 | Hahn | |
| 2002/0154153 A1 | 10/2002 | Messinger et al. | |
| 2002/0183978 A1 | 12/2002 | Koyama et al. | |
| 2003/0011629 A1 | 1/2003 | Rouse et al. | |
| 2003/0083789 A1 | 5/2003 | Kalley | |
| 2003/0098876 A1 | 5/2003 | Makinen | |
| 2003/0155494 A1 | 8/2003 | Olschewski | |
| 2004/0044502 A1 | 3/2004 | Ito et al. | |
| 2004/0044635 A1 | 3/2004 | Gordon et al. | |
| 2004/0090449 A1 | 5/2004 | MacLellan | |
| 2004/0175689 A1 | 9/2004 | Watanabe et al. | |
| 2004/0236610 A1 | 11/2004 | Nagaoka et al. | |
| 2004/0255234 A1 | 12/2004 | Methot | |
| 2005/0021294 A1 | 1/2005 | Trsar et al. | |
| 2005/0021309 A1 | 1/2005 | Alexander et al. | |
| 2005/0026129 A1 * | 2/2005 | Rogers | 434/322 |
| 2005/0081153 A1 | 4/2005 | Meissner | |
| 2005/0138559 A1 | 6/2005 | Santos-Gomez et al. | |
| 2006/0166778 A1 | 7/2006 | Tabata et al. | |

* cited by examiner

Reagent Needs
ABS
720

Home

User: Dade Behring    System Working    13:01:46

Help | Related Topics

Needs >> Reagent Cartridges    725

Load a Reagent Cartridge

1. Position a reagent cartridge in the loader with the tapered end pointing left.

[More Detail . . .] ← 730

2. Press the Load Button

729

| < Method | Lot Number | Quanity | Tests Remaining |
|---|---|---|---|
| < ABS | Any Lot | 3 | 0 |

Reagent Cartridges
Calibrator Vials
QC Vials

Available Slots
98

Print

| Samples | Racks | Methods | Setup | Patient Samples | System |
| Favorites | Guide | Help | | | |

Reagent Needs
ABS

User: Dade Behring    System Working

13:01:49

Home

Help | Related Topics | Needs >> Reagent Cartridges | More Help

Load a Reagent Cartridge

1. Position a reagent cartridge in the loader with the tapered end pointing left.

[More Detail . . .] ← 730

2. Press the Load button.

---

Load a Reagent Cartridge

You can load up to 20 cartridges at one time.

1. Position a reagent cartridge in the loader with the tapered end pointing left.

← 737

← 735

2. Press the Load button.

---

| Samples | Racks | Help | Patient Samples | System |
| Favorites | Methods | Guide | Setup | |

User: Dade Behring — System Working

13:01:52

736 ◁ □ ○ ↑ ↓ ▲Home  739

| Help | Related Topics | | More Help |

Help

The IMT Consumables screen lists the supplies needed to process IMT methods. The gauge next to each consumable icon indicates the approximate amount remaining. Yellow indicates near-expiration, red indicates expiration. Use this screen to determine if you need to perform one of these procedures:

Replace IMT Fluid ⟵ *734A*

Replace V-Lyte Multisensor ⟵ *734B*

IMT Consumables

1 — Standard B/Salt Bridge
- Lot Number
- Lot Expiration
- Days Remaining
- Percent Full 95%

2 — V-LYTE Standard
- Lot Number
- Lot Expiration
- Days Remaining
- Percent Full 99%

3 — V-LYTE Diluent
- Lot Number
- Lot Expiration
- Days Remaining
- Percent Full 99%

V-LYTE Multisensor
- Lot Number
- Lot Expiration
- Days Remaining 0
- Tests Left 5000

| Samples | Racks | Help |
| Favorites | Methods | Guide |

Setup | Patient Samples | System

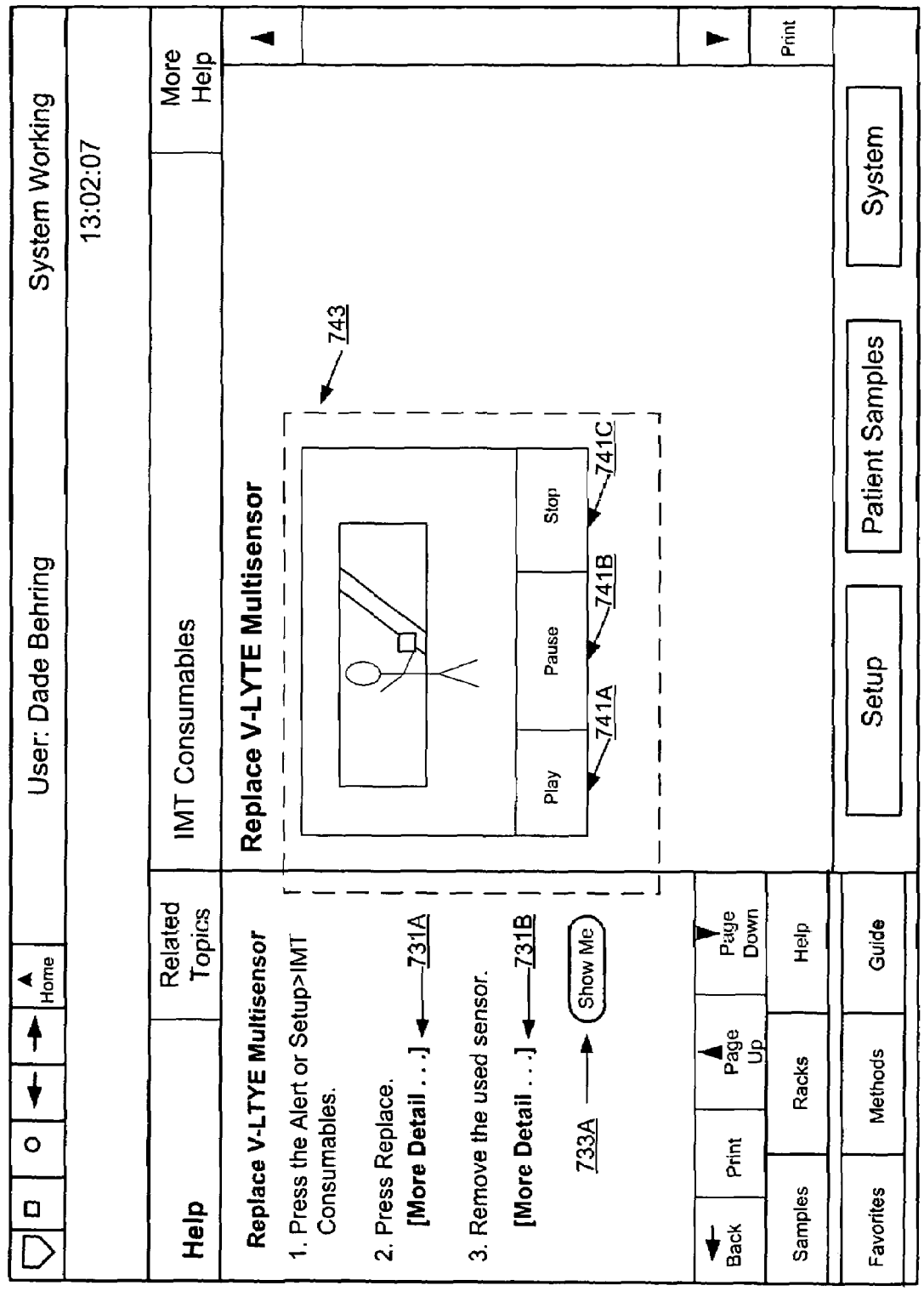

CONTEXT-SPECIFIC ELECTRONIC PERFORMANCE SUPPORT

RELATED PATENT APPLICATION

This patent application claims priority under 35 U.S.C. § 119 to U.S. Provisional Patent Application No. 60/691,573, entitled "System and Method for Electronic Performance Support," filed Jun. 17, 2005, the complete disclosure of which is hereby fully incorporated herein by reference.

FIELD OF THE INVENTION

The invention relates generally to providing performance support for a device and more particularly to providing context-specific electronic performance support for a device through just-in-time knowledge transfer.

BACKGROUND OF THE INVENTION

Healthcare in general and laboratory diagnostics in particular are in an unprecedented transition phase. Health care futurists have stated that the clinical laboratory may be on the threshold of a new era in which diagnostic tests become increasingly critical components of the health care system, due to the escalating use of technologies such as genetic, proteonmic, and pharmacogenic testing. The bureau of labor statistics has predicted that the demand for laboratory services will triple by 2010, partly due to the aging population (Beck et al., 2003).

At a time when laboratory test volume and sophistication are increasing, growing, and becoming even more vital to patient care, diagnosis, and safety, the laboratory force is rapidly graying and shrinking. It is predicted that, between 2002 and 2010, the industry will see an annual shortage of 8,200 professional laboratory workers per year (California Employment Development Department, 2004). Adding complexity to this transition process is the emergence and growth of managed health care in recent years, which has led to cost reductions and an increase in demand for efficiency among clinical laboratories.

These developments have resulted in many challenges for both laboratories and diagnostic companies. For example, laboratories are facing increasing training challenges. The laboratories must train more personnel with increasing work loads to understand deeper technical knowledge. Traditionally, laboratories have trained their personnel through off-site, instructor led classes. Now, the decrease of qualified workers, the increase in the number of personnel who must be trained, and the increased demand for efficiency limits the opportunity for such off-site, instructor-led training classes.

As a result, diagnostic companies are being challenged to develop user friendly laboratory technology that laboratory personnel can successfully operate without off-site, instructor-led training classes. In particular, the diagnostic companies are being challenged to bridge the education gap by delivering better, easier-to-use systems which integrate knowledge to the work place. Conventional approaches to such challenges include providing indexed users' manuals that laboratory personnel can review before and during use of laboratory technology.

The personnel can search the contents of the users' manuals for information pertaining to their particular questions and needs. However, because the information in the manuals generally is organized by topic and not by question/need, the personnel oftentimes spend considerable time searching for appropriate information. For example, the personnel generally spend considerable time filtering through volumes of irrelevant information to find information responsive to their particular questions and needs.

Compounding this is the fact that each of the personnel has a different knowledge base on which their questions/needs are based. For example, some personnel require in-depth, step-by-step help, whereas others require only a condensed overview of a particular subject. Due to the one-size-fits-all nature of traditional users' manuals, the personnel may receive too much or too little information.

Thus, a need exists in the art for a system and method for providing performance support for a laboratory device. Specifically, a need exists in the art for a system and method for providing a device user with help content that is specific to the user's particular needs. A further need exists in the art for a system and method for providing a device user with help content that is specific to the user's knowledge base.

SUMMARY OF THE INVENTION

The invention provides systems and methods for providing performance support for a device. Specifically, the invention provides systems and methods for providing context-specific electronic performance support for a device through just-in-time knowledge transfer. By providing context-specific electronic performance support, a device user can receive help content that is specific to the device user's particular needs. For example, the device can be an analytical workstation configured to perform one or more diagnostic procedures in a laboratory setting.

In one aspect of the invention, a content generator associated with the device can create performance support content. The performance support content can comprise information regarding device procedures, device alerts, and display screens for displaying information related to the device. A device procedure is a procedure that a device user can perform on or in connection with the device. For example, the performance support content can comprise a broad overview and/or a comprehensive outline of a device procedure. A device alert is a notification or instruction to the device user based on the device user's interactions with the device and/or a mechanical or software error associated with the device. For example, the performance support content can comprise a broad overview of a device alert and/or a comprehensive set of instructions for responding to the device alert. The performance support content can further comprise a description of each display screen that can be displayed in connection with the device. For example, the performance support content can comprise a description of each display screen of a software application of the device.

The content generator can store the performance support content in multiple content files. For example, for each device procedure, device alert, and display screen that can be displayed in connection with the device, the content generator can create a content file comprising performance support content. To create each content file, the content generator can identify performance support content related to the particular device procedure, device alert, or display screen from a master performance support file comprising a complete catalog of performance support content. The content generator can identify the related performance support content based on associations between the device procedures, device alerts, and display screens in the performance support file and/or in a separate data file.

In another aspect of the invention, a device user can interact with one or more display screens on a display associated with the device. For example, the display screen (s) can comprise information regarding a software application of the device and/or a device alert. The device user can respond to the information on the display screen(s) by taking action on or in connection with the device and/or by requesting performance support content. For example, the device user can request performance support content by activating an icon or hyperlink on the display screen(s).

A content publisher associated with the device can identify performance support content responsive to each request from one or more performance support content files. For example, the content publisher can identify the performance support content based on context information related to the display screen(s) on the display at the time of the request. The context information can comprise a name or other identifying indicia of the display screen(s). The content publisher can display a display screen comprising the identified performance support content on the display associated with the device.

The device user can respond to the information on the display screen(s) by taking action on or in connection with the device and/or by requesting additional performance support content. For example, if the displayed performance support content comprises only a simple overview of a particular procedure, a less experienced device user might request additional performance support content in the form of a comprehensive, step-by-step outline of the procedure and/or a video or animation illustrating at least a portion of the procedure.

These and other aspects, objects, features, and advantages of the invention will become apparent to those skilled in the art upon consideration of the following detailed description of illustrated exemplary embodiments, which include the best mode of carrying out the invention as presently perceived.

BRIEF DESCRIPTION OF THE DRAWINGS

FIG. 7, comprising FIG. 7A thru FIG. 7J, illustrates exemplary display screens which illustrate how context-specific electronic performance support for a device can be provided to a device user.

DETAILED DESCRIPTION OF EXEMPLARY EMBODIMENTS

Figure 1:
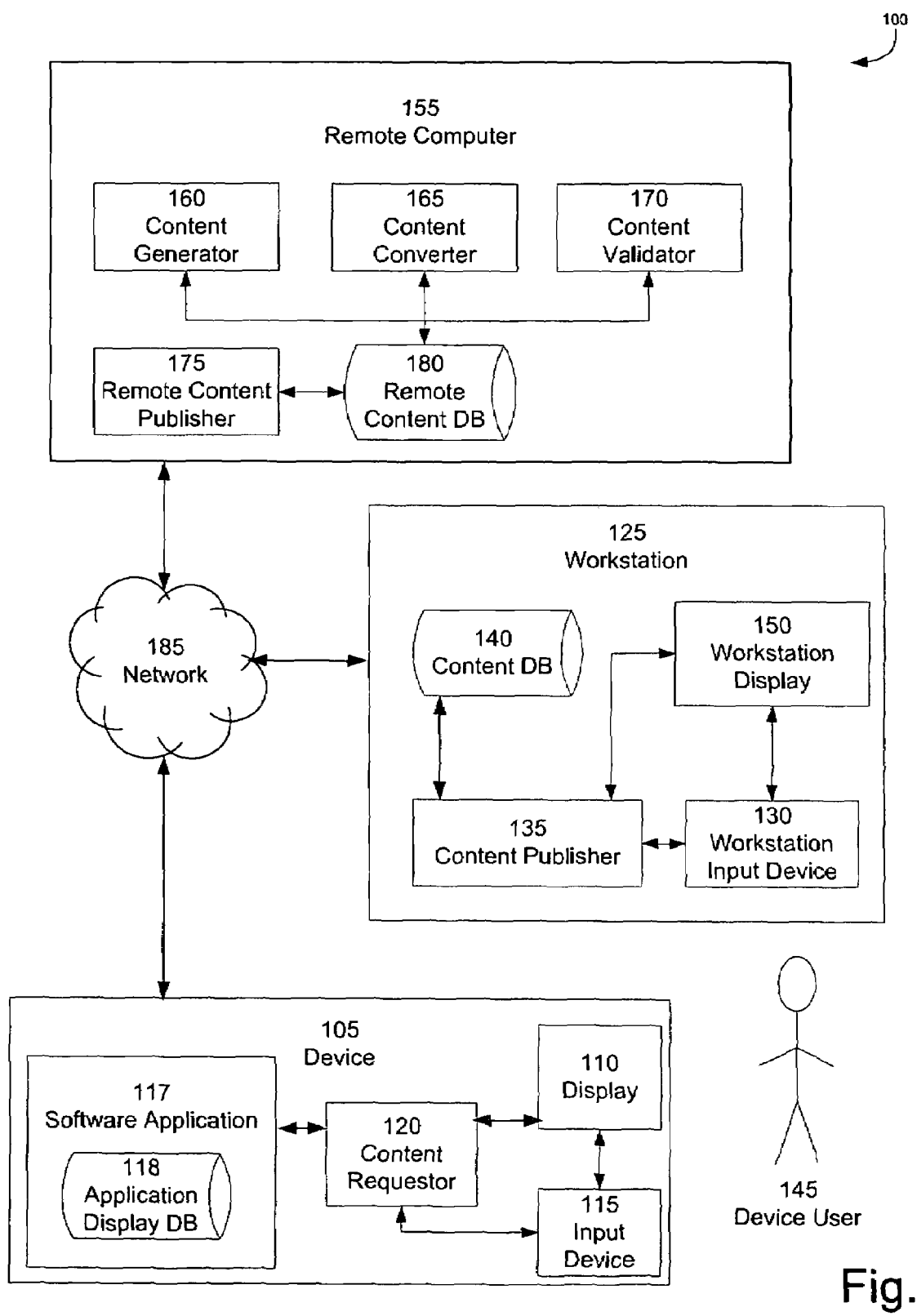
FIG. 1 is a block diagram depicting a system for providing context-specific electronic performance support for a device, according to an exemplary embodiment.

The invention is directed to systems and methods for providing performance support for a laboratory device. In particular, the invention is directed to providing context-specific electronic performance support for a device through just-in-time knowledge transfer. By providing context-specific electronic performance support, a user can receive help content that is specific to the user's particular needs.

In accordance with an exemplary embodiment, a device user can interact with a device and can request and view performance support content related to the device on a display associated with the device. The performance support content can comprise information related to the device, including data, images, animations, audio, videos, tools, and assessment and monitoring systems for the device. For example, the performance support content can comprise alerts that can be displayed to the device user based on the device user's interactions with the device. In addition, the performance support content can comprise instructions for performing procedures with the device and responding to alerts displayed in connection with the device.

The device user can interact with the device through one or more display screens on the display. For example, the device user can request performance support content for the device by activating an icon or hyperlink displayed on a display screen. A content publisher associated with the device can display a display screen comprising performance support content responsive to the device user's request. Depending on the device user's knowledge base, the displayed information can be simple or complex. For example, if the device user is more experienced, he can request performance support content comprising a simple overview of a device procedure. Alternatively, if the device user is less experienced, he can request performance support content comprising a comprehensive, step-by-step outline of a device procedure.

The performance support content can be tailored to the device user's needs at the time of the request. For example, the content publisher can identify and display performance support content related to the display screen(s) on the display at the time the device user submitted his request. Limiting the displayed performance support content to information related to the display screen(s) on the display at the time the device user submitted his request focuses the performance support content on information most likely to be relevant to the device user's needs at the time of the request.

The invention comprises a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an exemplary embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Turning now to the drawings, in which like numerals indicate like elements throughout the figures, exemplary embodiments of the invention are described in detail.

FIG. 1 is a block diagram depicting a system 100 for providing context-specific electronic performance support for a device 105, according to an exemplary embodiment. The system 100 comprises a remote computer 155 operable to generate performance support content and publish the performance support content to a workstation 125 associated with the device 105. A device user 145 can interact with the device 105 and can request and view performance support content related to the device 105 on a workstation display 150 of the workstation 125 and/or on a display 110 of the device 105.

The performance support content can comprise any information related to the device 105, including data, images, animations, audio, videos, tools, and assessment and monitoring systems for the device 105. For example, the performance support content can comprise descriptions of graphical user interface display screens that can convey information to the device user 145. The performance support content also can comprise information regarding procedures the device user 145 can perform with the device 105 and alerts that can be displayed to the device user 145 based on the device user's interactions with the device 105. For example, the performance support content can comprise brief overviews of device procedures and alerts and/or comprehensive, step-by-step instructions for completing certain device procedures or responding to device alerts.

As used herein, the term "procedure" refers to a series of one or more steps for performing a specific task. For example, a procedure can comprise a series of steps for replacing a reagent cartridge of a laboratory device 105. As used herein, the term "alert" refers to a signal or notification that conveys information to the alert recipient. For example, an alert can warn the device user 145 of a mechanical or software error of the device 105. Alternatively, the alert can notify the device user 145 of a need to take a certain action for proper application of the device 105 and/or a computer software application 117 of the device. For example, the alert can notify the device user 145 of a need to replace a reagent cartridge of the device 105.

The term "display screen" is used herein to refer to any graphical user interface or portion thereof that can be displayed on the display 110 or the workstation display 135. For example, a display screen can comprise information regarding the computer software application 117 of the device 105 and/or performance support content related to the computer software application 117 and/or the device 105. In one embodiment of the invention, a display screen can comprise an alert to the device user 145, a brief overview of a device procedure, step-by-step instructions for completing a device procedure, an animation or video related to a device procedure, and/or a description of another display screen.

The remote computer 155, workstation 125, and device 105 are interconnected via a network 185. The network 185 can comprise any wired or wireless telecommunication means by which network devices can exchange data, including for example, a direct data link, a local area network (LAN), a wide area network (WAN), an intranet, an Internet, or any combination thereof. Throughout the discussion of exemplary embodiments of the invention, it should be understood that the terms "data" and "information" are used interchangeably herein to refer to text, images, audio, video, and/or any other form of information that can exist in a computer-based environment.

Each remote computer 155, workstation 125, and device 105 can be a computer terminal, desktop computer, laptop computer, handheld device, or any other wired or wireless, processor-driven device. For example, the device 105 can be a personal computer, cellular phone, or a personal digital assistant (PDA). In one embodiment of the invention, the device 105 can be an analytical workstation configured to perform one or more diagnostic procedures in a laboratory setting. A person of skill in the art will recognize that the remote computer 155, the workstation 125, and/or the device 105 can be part of the same physical unit or they can be separate components.

The device 105 can comprise at least one computer software application 117. For example, the device 105 can comprise Dimension Vista™ software, available from Dade Behring Inc., Deerfield, Ill., for performing certain diagnostic procedures in a laboratory setting. The computer software application 117 can include an application display database 118 comprising graphical user interface display screens for use with the computer software application 117. For example, the display screens of the computer software application 117 can be displayed on the display 110 of the device 105 and/or the workstation display 150.

A content requester 120 of the device 105 can request performance support content related to the device 105 and/or the computer software application 117 from a content database 140 of the workstation 125. The content requester 120 can transmit any received performance support content to the display 110 of the device 105 and/or the workstation display 150 for viewing by the device user 145.

One or more persons knowledgeable about the device 105 can create the performance support content using a content generator 160 of the remote computer 155. The content generator 160 can comprise any suitable electronic content authoring solution known in the art, such as Adobe® FrameMaker®.

In one embodiment of the invention, the content generator 160 can store the performance support content in multiple content files, collectively referred to herein as the "operator's guide". Each of the content files of the operator's guide can include at least one performance support content section comprising information regarding a display screen description, a device alert, and/or a device procedure. For example, a content file can comprise an animation or video illustrating a particular step of a device procedure. The content generator 160 can store the operator's guide in a remote content database 180 of the remote computer 155.

The content generator 160 can associate each content section with one or more display screens for conveying the information in the content sections to the device user 145 on the workstation display 130 or the display 110 of the device 105. For example, the content generator 160 can generate a display screen list file comprising names of display screens that can be used to convey information, such as the performance support content in the content sections, to the device user 145. In the display screen list file, the content generator 160 can associate each display screen with one or more of the content sections of the operator's guide. A person of skill in the art will appreciate that other associations can be used. For example, the content generator 160 can associate the display screens and content sections with a unique identifier, such as a unique identification number. The content generator 160 can store the display screen list file in the remote content database 180.

A content converter 165 of the remote computer 155 can convert the multiple content files of the operator's guide to a single performance support file. For example, the content converter 165 can convert the multiple content files in an Adobe® FrameMaker® file format to the single performance support file in an extensible markup language ("XML") file format. In one embodiment of the invention, at least a portion of the performance support file can adhere to the DocBook DTD industry standard XML schema. For example, the performance support file can comprise tags and rules that add structure to the information in the performance support file. The content converter 165 can store the performance support file in the remote content database 180.

A content validator 170 of the remote computer 155 can validate the contents of the performance support file. For example, the content validator 170 can determine whether the performance support file conforms to the DocBook DTD schema, whether any display screen names in the performance support file are valid, and whether any unnecessary, duplicate content is present in the performance support file.

The functionality of the content validator 170 is described in more detail below with reference to FIG. 4.

For each of the display screens listed in the display screen list file, the content generator 160 can identify the content in the performance support file associated with the display screen. For example, the content generator 160 can identify the content associated with the display screens based on the associations in the display screen list file. For each of the display screens, the content generator 160 can create a new content file comprising the identified, associated content. For example, the content generator 160 can generate each new content file in the XML file format.

The content generator 160 can store the new content files in the remote content database 180. In one embodiment of the invention, the content generator 160 can store each new content file with a file name based on the display screen to which the content file corresponds. For example, the content generator 160 can store each new content file with a file name comprising the name of the display screen to which the content file corresponds. Alternatively, the content generator 160 can store each new content file with a file name comprising the name of a procedure or alert to which the content file corresponds. A remote content publisher 175 of the remote computer 155 can publish the new content files to the content database 140 of the workstation 125.

In response to a request for performance support content, a content publisher 135 of the workstation 125 can read performance support content in the content files stored in the content database 140. The content publisher 135 can transmit the read performance support content to the workstation display 150 and/or the display 110 of the device 105 for viewing by the device user 145. For example, the device user 145 can request the performance support content through an input device 115 of the device 105 or through a workstation input device 130. Each of the input device 115 and the workstation input device 130 can comprise any suitable means for interacting with a computer, such as a keyboard, mouse, trackball, electronic pen, microphone, joystick, game pad, scanner, or the like.

The content requestor 120 and the content publisher 135 can process requests received through the input device 115 of the device 105 and the workstation input device 130, respectively. For example, based on a request received through the input device 115 of the device 105, the content requester 120 can submit a request for performance support content to the content publisher 135. In one embodiment of the invention, each request the content requester 120 submits to the content publisher 135 can comprise information regarding content displayed on the display 110 at the time of the request ("context information"). For example, the context information can comprise a name of each display screen on the display 110 at the time of the request. The context information can assist the content publisher 135 in identifying performance support content relevant to the display screen(s) or on the display 110, and thus relevant to any questions or needs of the device user 145 who is interacting with the display screen(s).

In one embodiment of the invention, the content requestor 120 can submit a request for certain performance support content to the content publisher 135 without first receiving a request for the content from the device user 145. For example, the content requestor 120 can request the content publisher 135 to display an alert to the device user 145 based on the device user's interactions with the device 105. The alert can comprise information related to the device 105 and/or the computer software application 117 of the device 105. For example, the alert can comprise an instruction to the device user 145 to perform certain actions necessary for proper application of the device 105 and/or the computer software application 117. Alternatively, or in addition, the alert can inform the device user 145 of a mechanical or software error of the device 105.

Figure 2:
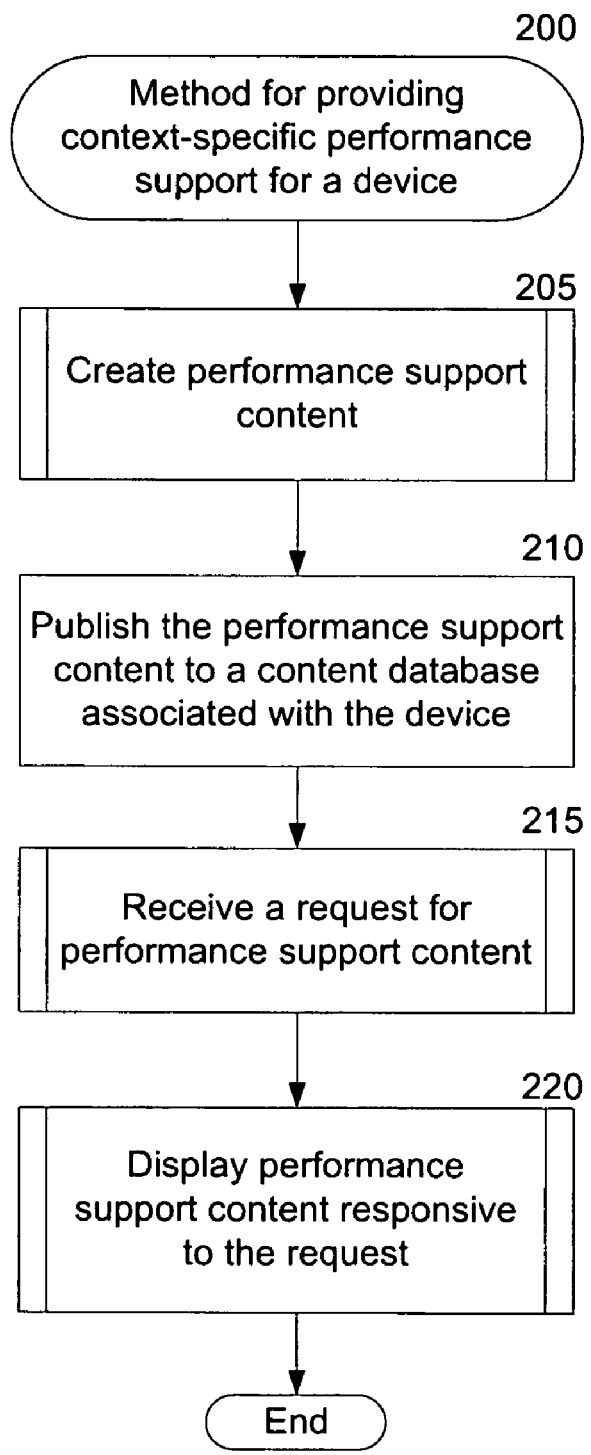
FIG. 2 is a flow chart depicting a method for providing context-specific electronic performance support for a device, according to an exemplary embodiment.

FIG. 2 is a flow chart depicting a method 200 for providing context-specific electronic performance support for a device 105, according to an exemplary embodiment. The exemplary method 200 is merely illustrative and, in alternative embodiments of the invention, certain steps can be performed in a different order, performed in parallel with one another, or omitted entirely, and/or certain additional steps can be performed without departing from the scope and spirit of the invention. The method 200 is described below with reference to FIGS. 1 and 2.

In step 205, the content generator 160 creates performance support content. For example, one or more persons knowledgeable about the device 105 can create the performance support content using the content generator 160. The content generator 160 can comprise any suitable electronic content authoring solution known in the art, such as Adobe® FrameMaker®. Step 205 is described in more detail below with reference to FIG. 3.

In step 210, the remote content publisher 175 publishes the performance support content generated in step 205 to the content database 140 of the workstation 125. For example, the remote content publisher 175 can transmit the performance support content to the content database 140 via the network 185.

In step 215, the content publisher 135 receives a request for performance support content. For example, the content publisher 135 can receive the request from the workstation input device 130 or the content requestor 120. Requests from the content requester 120 can be based on requests received by the content requestor 120 from the input device 115. An embodiment of step 215 in which the content publisher 135 receives the request from the content requestor 120 is described in more detail below with reference to FIG. 5.

In step 220, the performance support content requested in step 215 is displayed on the workstation display 150 and/or the display 110 of the device 105. For example, the content publisher 135 can read the requested performance support content from the content database 140 and transmit the read performance support content to the workstation display 150 and/or the display 110 of the device 105. Step 220 is described in more detail below with reference to FIG. 6.

Figure 3:
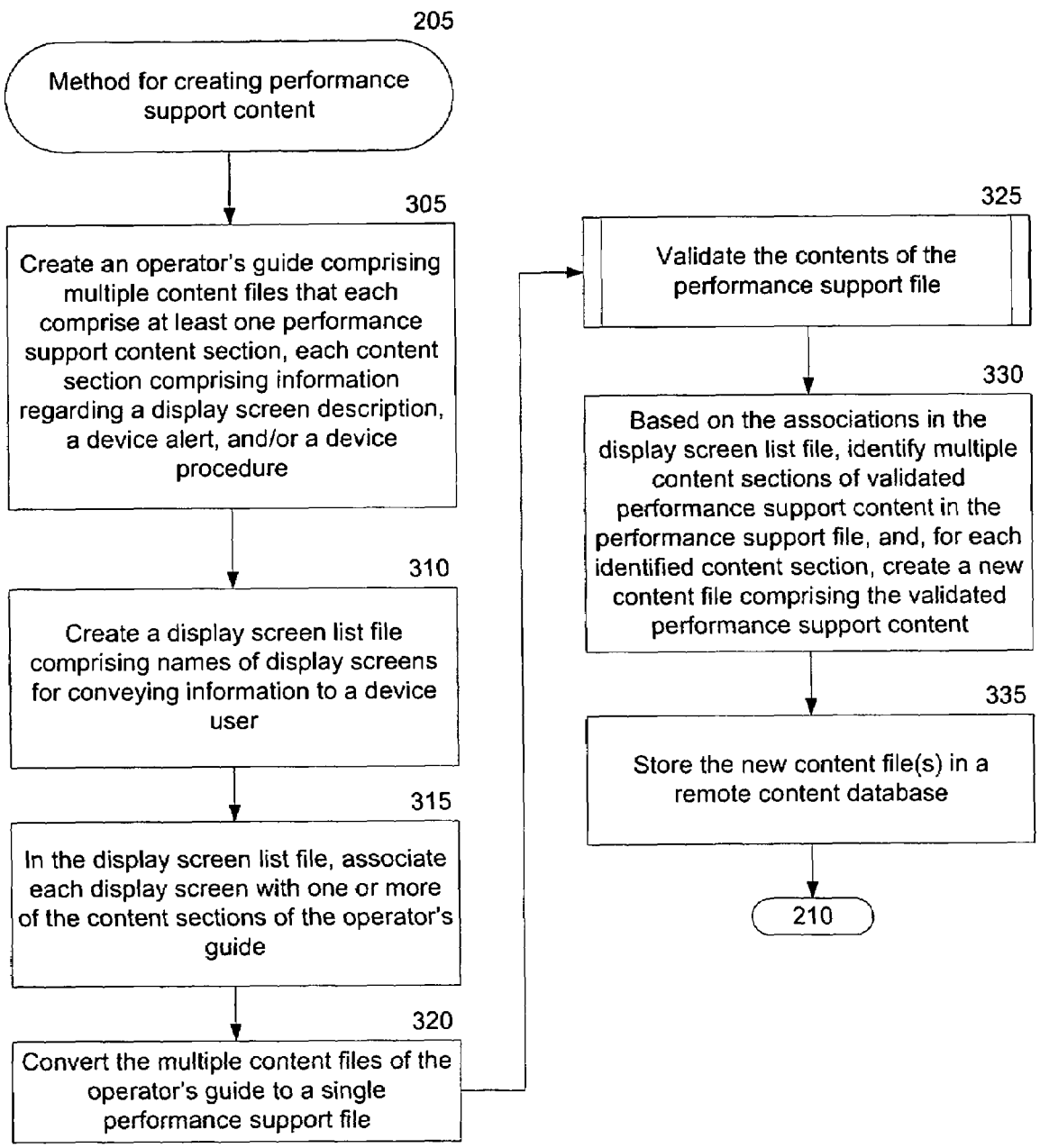
FIG. 3 is a flow chart depicting a method for creating performance support content, according to an exemplary embodiment.

FIG. 3 is a flow chart depicting a method 205 for creating performance support content, according to an exemplary embodiment, as referred to in step 205 of FIG. 2. The exemplary method 205 is merely illustrative and, in alternative embodiments of the invention, certain steps can be performed in a different order, performed in parallel with one another, or omitted entirely, and/or certain additional steps can be performed without departing from the scope and spirit of the invention. The method 205 is described below with reference to FIGS. 1 and 3.

In step 305, the content generator 160 creates a representative document or representative content, such as an operator's guide. The operator's guide comprises multiple content files, each of which includes at least one performance support content section. Each performance support content section comprises information regarding a display screen description, a device alert, and/or a device procedure. For example, a performance support content section can comprise a brief overview of a device procedure or alert. Alternatively, a performance support content section can comprise a comprehensive set of instructions for completing a particular device procedure or responding to a particular device alert. The content generator 160 can store the operator's guide in the remote content database 180.

In step 310, the content generator 160 creates a display screen list file comprising names of display screens that can be used to convey information, such as the performance support content in the content sections and/or information related to the software application 117, to the device user 145. In the display screen list file, the content generator 160 associates each display screen with one or more of the content sections of the operator's guide in step 315. For example, the content generator 160 can associate the display screens and content sections with common identification numbers or other suitable data links known in the art. The content generator 160 can store the display screen list file in the remote content database 180.

In step 320, the content converter 165 converts the multiple content files of the operator's guide to a single performance support file. For example, the content converter 165 can convert the multiple content files in an Adobes® FrameMaker® file format to the single performance file in an XML file format. In one embodiment of the invention, at least a portion of the performance support file can adhere to the DocBook DTD industry standard XML schema. For example, the performance support file can comprise tags and rules that add structure to the information in the performance support file. The content converter 165 can store the performance support file in the remote content database 180.

In step 325, the content validator 170 validates the contents of the performance support file. For example, the content validator 170 can determine whether the performance support file conforms to the DocBook DTD schema, whether any display screen names in the performance support file are valid, and whether any unnecessary, duplicate content is present in the performance support file. Step 325 is described in more detail below with reference to FIG. 4.

In step 330, the content generator 160 identifies multiple content sections of validated performance support content in the performance support file based on the associations in the display screen list file. For example, the content generator 160 can identify a content section for each display screen description, device procedure, and/or device alert. The content generator 160 also can identify a content section for each display screen listed in the display screen list file. For example, the content generator 160 can identify a content section for a particular display screen by identifying each portion of content associated with the display screen in the display screen list file.

For each content section identified in step 330, the content generator 160 creates a new content file comprising the content of the content section. For example, the content generator 160 can generate each new content file in the XML file format. Each new content file can comprise one or more hyperlinks and icons for accessing content in another content file.

In step 335, the content generator 160 stores each new content file in the remote content database 180. In one embodiment of the invention, the content generator 160 can store each new content file with a file name based on the display screen description, device procedure, device alert, and/or display screen to which the content file corresponds. For example, the content generator 160 can store each new content file with a file name comprising the name of the display screen to which the content file corresponds. The method 205 then branches to step 210 (FIG. 2).

Figure 4:
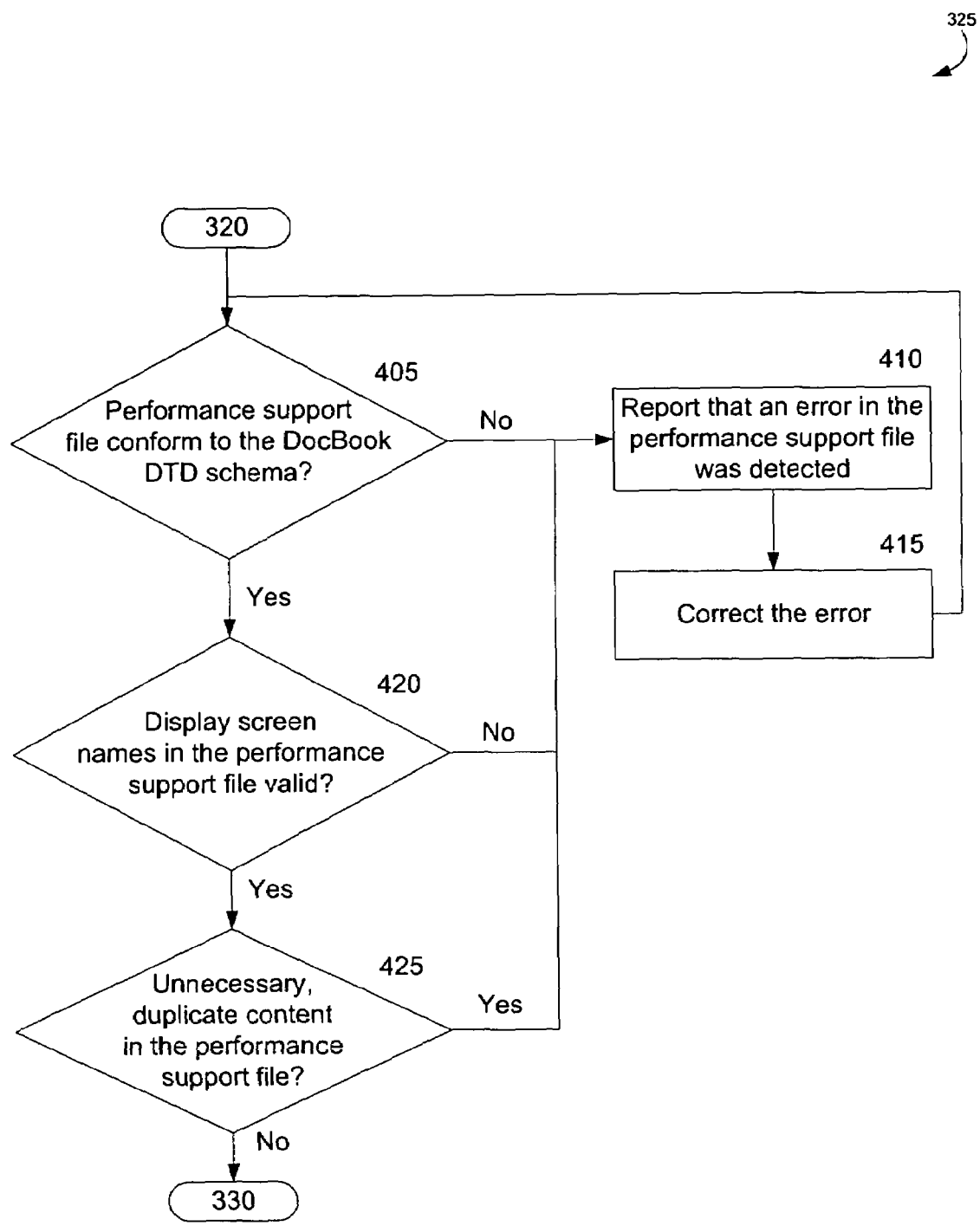
FIG. 4 is a flow chart depicting a method for validating the contents of a performance support file, according to an exemplary embodiment.

FIG. 4 is a flow chart depicting a method 325 for validating the contents of a performance support file, according to an exemplary embodiment, as referred to in step 325 of FIG. 3. The exemplary method 325 is merely illustrative and, in alternative embodiments of the invention, certain steps can be performed in a different order, performed in parallel with one another, or omitted entirely, and/or certain additional steps can be performed without departing from the scope and spirit of the invention. The method 325 is described below with reference to FIGS. 1 and 4.

In step 405, the content validator 170 determines whether the performance support file conforms to the DocBook DTD schema. If not, the method 325 branches to step 410. In step 410, the content validator 170 reports that it detected an error in the performance support file. For example, the content validator 170 can display an alert reporting the error on a display (not shown) of the remote computer 155. For example, the content validator 170 can identify the error and the location in the performance support file in which the content validator 170 detected the error in the alert. In step 415, a user of the remote computer 155 corrects the error. For example, the user can correct the error using the content generator 160. Then, the method 325 branches to step 405 to repeat the validation of the corrected file.

If the content validator 170 determines in step 405 that the performance support file conforms to the DocBook DTD schema, then the method 325 branches to step 420. In step 420, the content validator 170 determines whether any display screen names in the performance support file are valid. For example, the content validator 170 can identify each display screen name in the performance support file and compare each name to the list of names in the display screen list file. If a name in the performance support file does not exist in the display screen list file, the content validator 170 can determine that at least one invalid display screen name is present in the performance support file.

If the content validator 170 makes such a determination, the method 325 branches to step 410. In step 410, the content validator 170 reports that it detected an error in the performance support file. For example, the content validator 170 can display an alert reporting the error on a display (not shown) of the remote computer 155. For example, the content validator 170 can identify the error and the location in the performance support file in which the content validator 170 detected the error in the alert. In step 415, a user of the remote computer 155 corrects the error. For example, the user can correct the error using the content generator 160. Then, the method 325 branches to step 405 to repeat the validation of the corrected file.

If the content validator 170 determines in step 420 that the performance support file does not include any invalid display screen names, the method 325 branches to step 425. In step 425, the content validator 170 determines whether the performance support file contains any unnecessary, duplicate content. For example, the content validator 170 can determine that the performance support file contains unnecessary, duplicate content if the performance support file contains multiple copies of the same content section of the operator's guide.

If the content validator 170 determines in step 425 that the performance support file contains any unnecessary, duplicate content, the method 325 branches to step 410. In step 410, the content validator 170 reports that it detected an error in the performance support file. For example, the content validator 170 can display an alert reporting the error on a display (not shown) of the remote computer 155. For example, the content validator 170 can identify the error and the location in the performance support file in which the content validator 170 detected the error in the alert. In step 415, a user of the remote computer 155 corrects the error. For example, the user can use the content generator 160 to correct the error. Then, the method 325 branches to step 405 to repeat the validation of the corrected file.

If the content validator 170 determines in step 420 that the performance support file does not contain any unnecessary, duplicate content, the method 325 branches to step 330 (FIG. 3).

Figure 5:
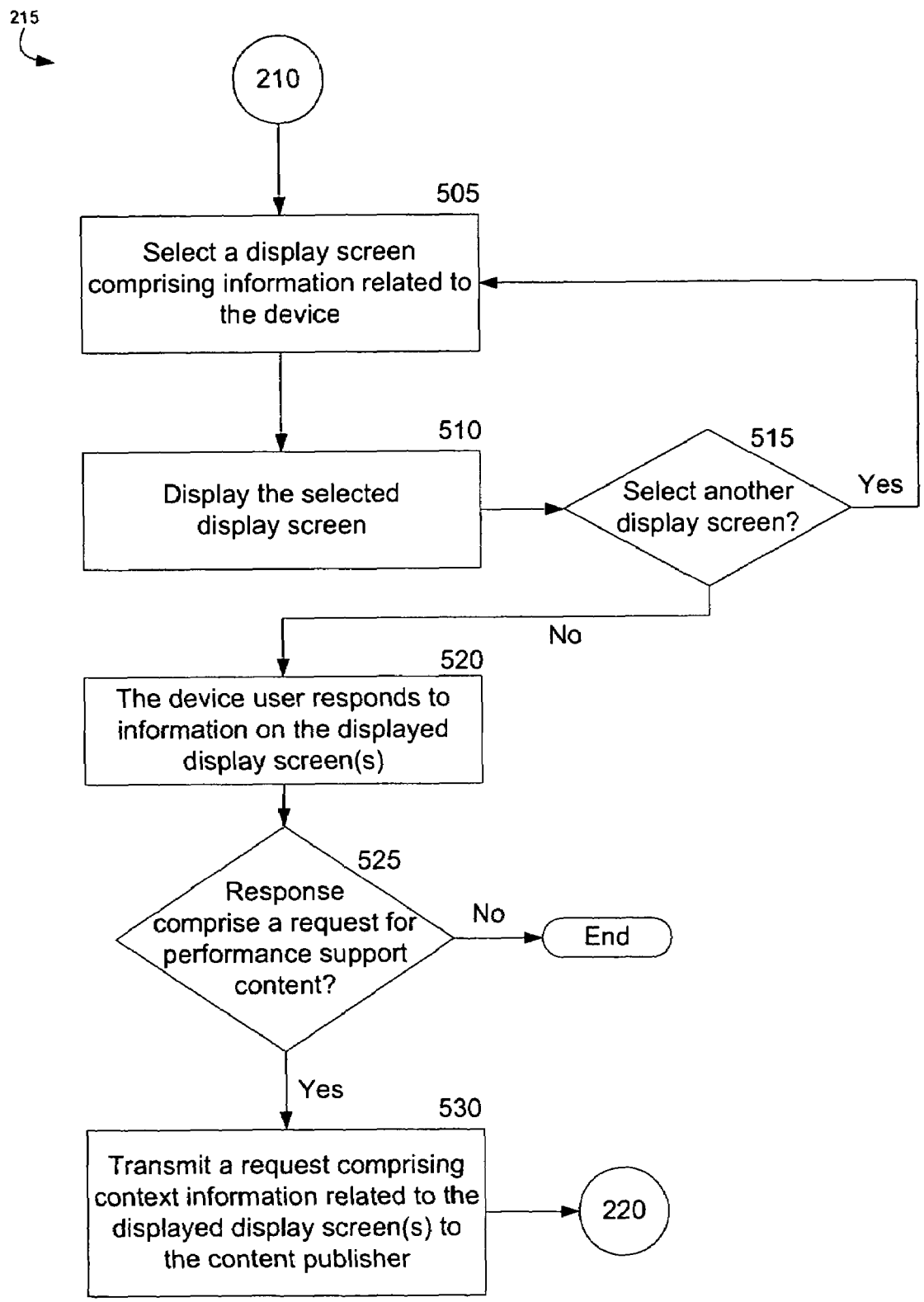
FIG. 5 is a flow chart depicting a method for receiving a request for performance support content, according to an exemplary embodiment.

FIG. 5 is a flow chart depicting a method 215 for receiving a request for performance support content, according to an exemplary embodiment, as referred to in step 215 of FIG. 2. The exemplary method 215 is merely illustrative and, in alternative embodiments of the invention, certain steps can be performed in a different order, performed in parallel with one another, or omitted entirely, and/or certain additional steps can be performed without departing from the scope and spirit of the invention. The method 215 is described below with reference to FIGS. 1 and 5.

In step 505, the device 105 selects a display screen comprising information related to the device 105 for display on the display 110 and/or the workstation display 150. For example, the software application 117 of the device 105 can select a display screen from the application display database 118. An exemplary display screen of the software application 117 is described in more detail below with reference to FIG. 7A. The device 105 displays the selected display screen on the display 110 and/or the workstation display 150 in step 510.

In step 515, the device 105 determines whether to select another display screen for display. For example, based on the device user's interactions with the device 105 and/or the display screen displayed in step 510, the content requestor 120 of the device can determine to select a display screen comprising an alert to the device user 145. The alert can comprise information related to the device 105 and/or the computer software application 117 of the device 105. For example, the alert can comprise an instruction to the device user 145 to perform certain actions necessary for proper application of the device 105 and/or the computer software application 117. Alternatively, the alert can notify the device user 145 of a mechanical or software error of the device 105.

If the device 105 determines in step 515 to select another display screen for display, the method 215 branches to step 505 for selection and display of the other display screen. If the device 105 determines in step 515 not to select another display screen for display, the method 215 branches to step 520.

In step 520, the device user 145 responds to the information on the displayed screen(s). For example, the device user 145 can respond by performing an activity on or in connection with the device 105 or interacting with the input device 115 and/or workstation input device 130. For example, the device user 145 can respond by activating a "Help" icon on the display screen(s) to request certain performance support content.

In step 525, the content requester 120 determines whether the response of the device user 145 included a request for performance support content. For example, the content requestor 120 can determine that the response of the device user 145 included a request for performance support content if the response included activation of a "Help" icon displayed on the display 110 of the device 105.

In an alternative exemplary embodiment of the invention, the content publisher 135 can determine whether the device user 145 submitted a request for performance support content. For example, the content publisher 135 can determine that the response of the device user 145 included a request for performance support content if the response included activation of a "Help" icon displayed on the workstation display 150.

If the content requester 120 determines in step 525 that the response of the device user 145 included a request for performance support content, then the method 215 branches to step 530. In step 530, the content requestor 120 transmits a request comprising context information related to the displayed display screen(s) to the content publisher 135. For example, the context information can comprise a name or other identifying indicia of each display screen on the display 110 at the time of the request. The method 215 then branches to step 220 (FIG. 2).

Figure 6:
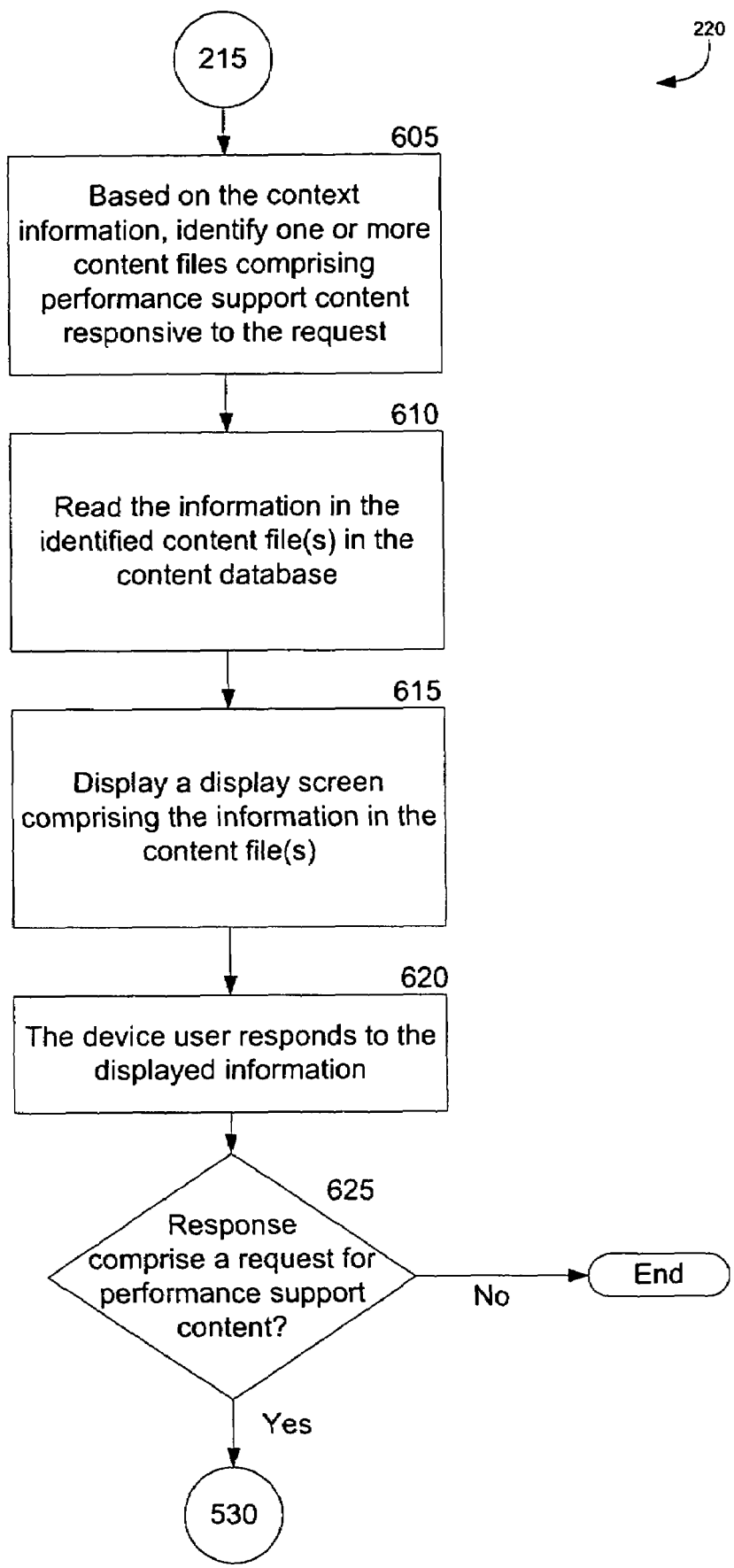
FIG. 6 is a flow chart depicting a method for displaying performance support content, according to an exemplary embodiment.

FIG. 6 is a flow chart depicting a method 220 for displaying performance support content, according to an exemplary embodiment, as referred to in step 220 of FIG. 2. The exemplary method 220 is merely illustrative and, in alternative embodiments of the invention, certain steps can be performed in a different order, performed in parallel with one another, or omitted entirely, and/or certain additional steps can be performed without departing from the scope and spirit of the invention. The method 220 is described below with reference to FIGS. 1, 5, and 6.

In step 605, the content publisher 135 reads the context information transmitted to it in step 530 and identifies at least one content file in the content database 140 comprising information responsive to the request for performance support content received in step 520. The content publisher 135 identifies the content file(s) based on the context information. For example, if the context information includes a name of a particular display screen description, display screen, alert, or procedure, the content publisher 135 can identify a content file with a name similar or identical to the particular display screen description, display screen, alert, or procedure. A person of skill in the art will recognize that the context information can include other information related to an association between a content file and a display screen description, display screen, alert, or procedure. For example, the context information can include a unique identifier, such as a unique identification number, which is common to the content file and a display screen description, display screen, alert, or procedure.

In step 610, the content publisher 135 reads the information in the content file(s) identified in step 605. In step 615, the content publisher 135 displays a display screen comprising the information read in step 610.

In step 620, the device user 145 responds to the information on the display screen displayed in step 615. For example, the device user 145 can respond by performing an activity on or in connection with the device 105 or interacting with the input device 115 and/or workstation input device 130. For example, the device user 145 can respond by activating a "More Detail" icon, a "Related Topics" icon, or a "Show Me" icon on the display screen to request certain performance support content.

In step 625, the content requester 120 determines whether the response of the device user 145 included a request for performance support content. For example, the content requestor 120 can determine that the response of the device user 145 included a request for performance support content if the response included activation of a "More Detail" icon, a "Related Topics" icon, or a "Show Me" icon displayed on the display 110 of the device 105.

In an alternative exemplary embodiment of the invention, the content publisher 135 can determine whether the device user 145 submitted a request for performance support content. For example, the content publisher 135 can determine that the response of the device user 145 included a request for performance support content if the response included activation of a "More Detail" icon, a "Related Topics" icon, or a "Show Me" icon displayed on the workstation display 150.

If the content requestor 120 determines in step 625 that the response of the device user 145 included a request for performance support content, then the method 220 branches to step 530 (FIG. 5).

FIG. 7, comprising FIGS. 7A thru 7J, illustrates exemplary display screens 700, which illustrate how context-specific electronic performance support for a device 105 can be provided to a device user 145, according to an exemplary embodiment. Each of FIGS. 7A thru 7J illustrates a display screen 700 of a device 105 or a workstation 125 associated with the device 105. Each display screen 700 comprises information related to the device 105, such as performance support content a device user 145 can review when operating the device 105. Each of FIGS. 7A thru 7J is merely illustrative and, in alternative embodiments of the invention, certain elements of the FIGS. 7A thru 7J can be altered, certain elements can be omitted entirely, and/or certain additional elements can be included without departing from the scope and spirit of the invention.

Figure 7A:
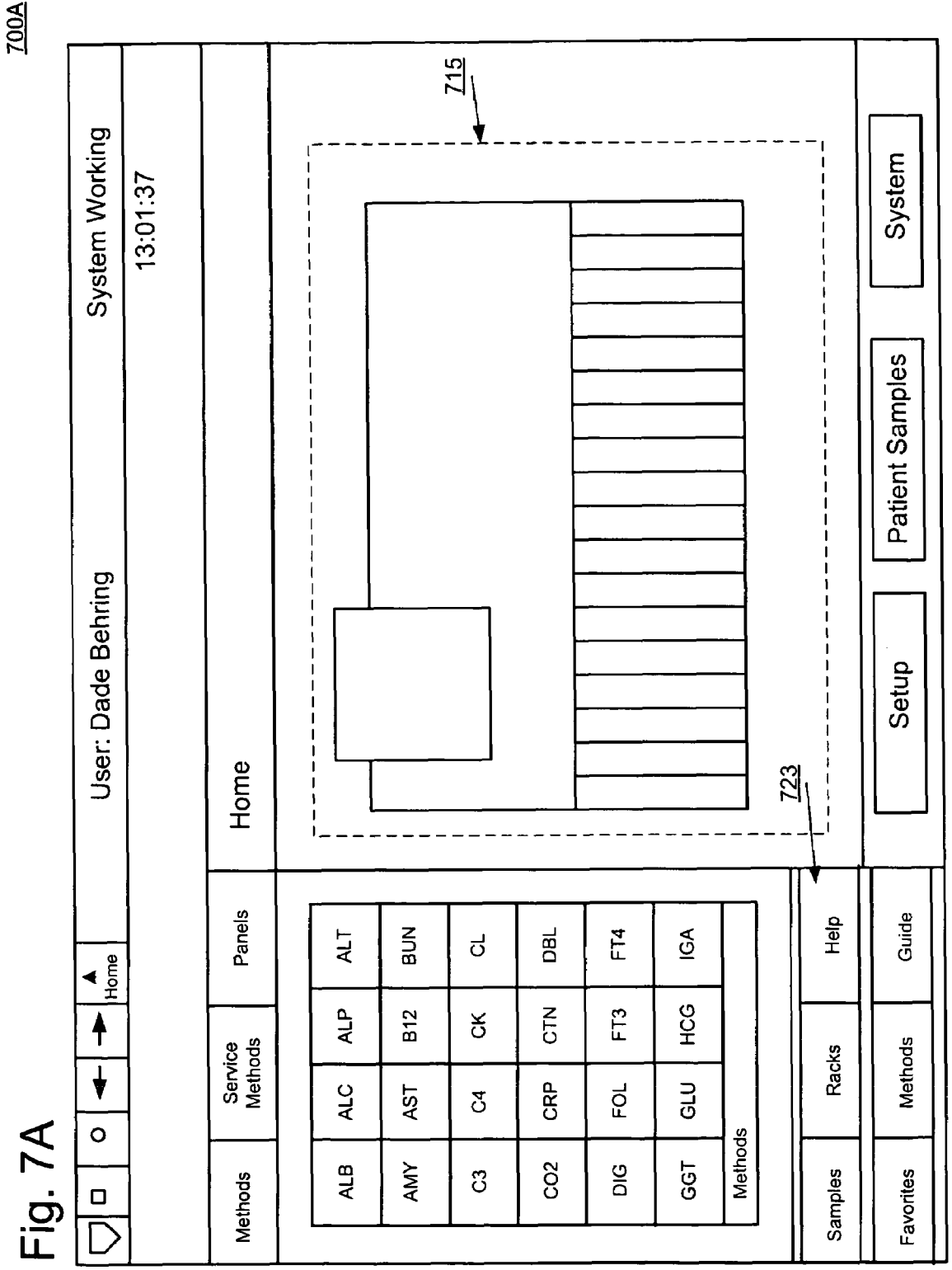

FIG. 7A comprises an exemplary display screen 700A of a software application 117 of the device 105. For example, the software application 117 can comprise Dimension Vista™ software for performing certain diagnostic procedures in a laboratory setting. The display screen 700A comprises an image 715 of the device 105 and various links and icons with which the user can interact when operating the device 105 and the software application 117. Among the links and icons of the display screen 700A is a "Help" icon 723 that the device user 145 can activate to request performance support content related to the device 105 and/or the software application 117.

For example, as set forth above in connection with step 530 of FIG. 5, activation of the "Help" icon 723 can prompt the content requestor 120 of the device 105 to transmit a request comprising context information related to the display screen 700A to the content publisher 135. For example, the context information can comprise a name or other identifying indicia of the display screen 700A. In response to the request, the content publisher 135 can have performance support content responsive to the request displayed on the display 110 of the device 105 and/or the workstation display 150. By including context information related to the display screen 700A in the request, the content publisher 135 can identify and display performance support content that is context-specific to the device user's particular actions and needs at the time of the request.

Figure 7B:
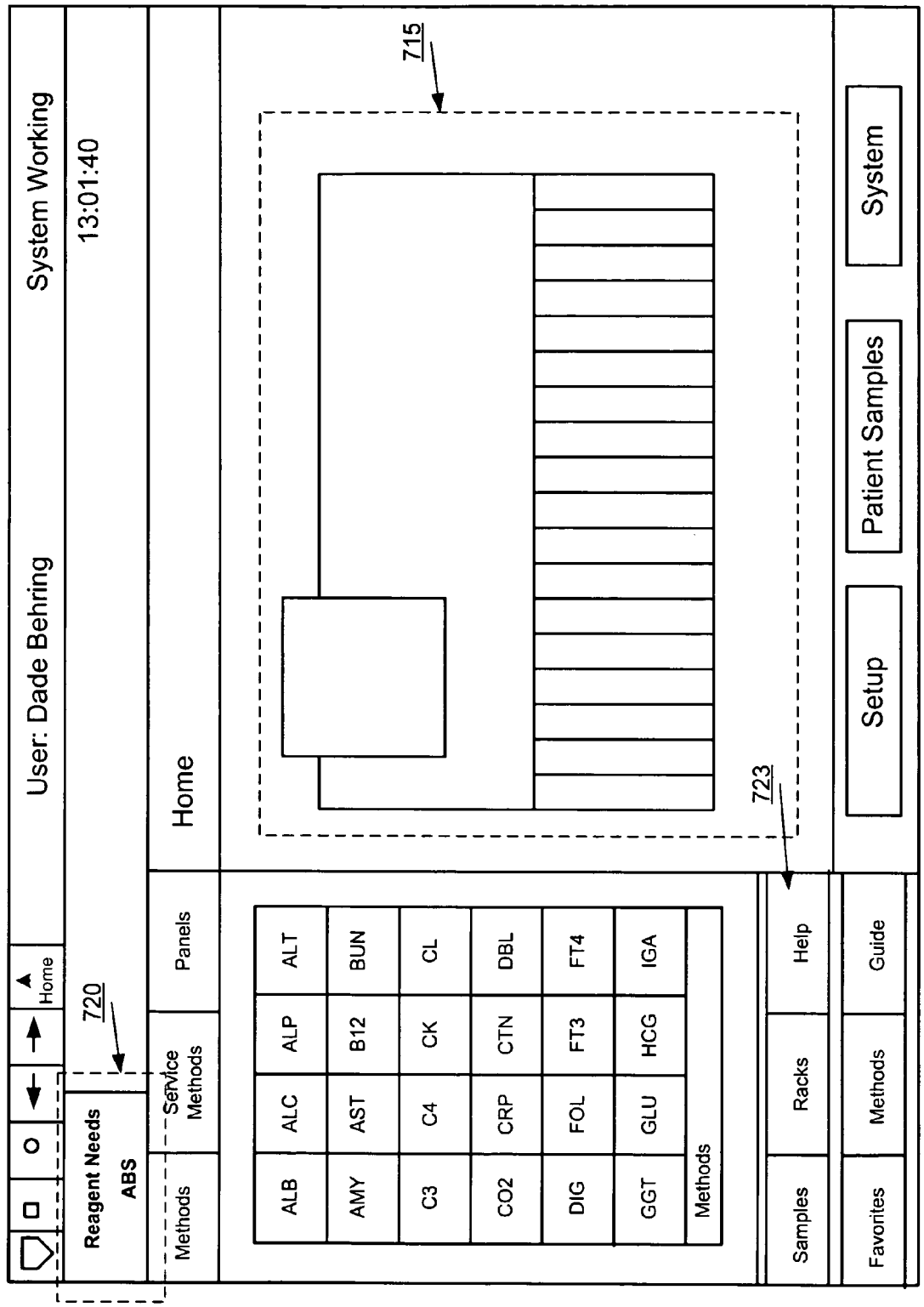

FIG. 7B comprises an alternative exemplary display screen 700B. The display screen 700B comprises a display screen of the software application 117 and an alert display screen 720 comprising an alert instructing the device user 145 to perform an action in connection with the device 105 and/or the software application 117. For example, the alert can instruct the device user 145 to perform an action necessary for proper application of the device 105 and/or the software application 117. To help draw the device user's attention to the alert display screen 720, the alert display screen 720 can be displayed in a different color than other items on the display screen 700B and/or a sound byte can be played upon display of the alert display screen 720, in certain embodiments of the invention. For example, the alert display screen 720 can be displayed with a bright red or yellow background.

As with the display screen 700A of FIG. 7A, the display screen 700B comprises a "Help" icon 723 that the device user 145 can activate to request performance support content related to the device 105 and/or the software application 117. For example, the device user 145 can activate the "Help" icon 723 to receive performance support content related to the alert of the alert display screen 720.

Activation of the "Help" icon 723 can prompt the content requestor 120 of the device 105 to transmit a request comprising context information related to the display screen 700B and/or the alert display screen 720 to the content publisher 135. For example, the context information can comprise a name or other identifying indicia of the display screen 700B and/or the alert display screen 720. In response to the request, the content publisher 135 can have performance support content responsive to the request displayed on the display 110 of the device 105 and/or the workstation display 150. By including context information related to the display screen 700B and/or alert display screen 720 in the request, the content publisher 135 can identify and display performance support content that is context-specific to the device user's particular actions and needs at the time of the request.

Figure 7C:
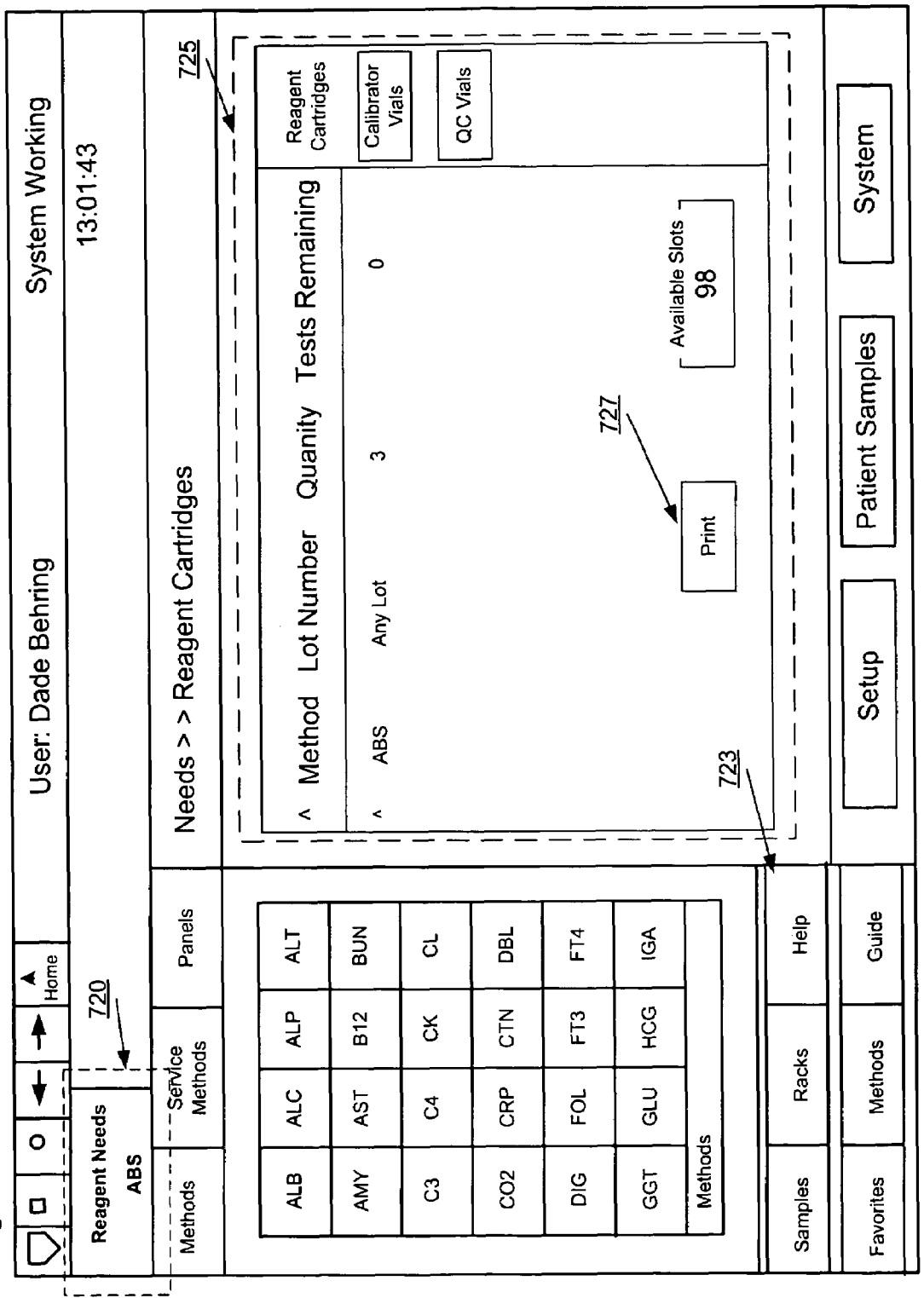

FIG. 7C comprises an alternative exemplary display screen 700C. As with FIG. 7B, the display screen 700C comprises a display screen of the software application 117 and an alert display screen 720 comprising an alert instructing the device user 145 to perform an action in connection with the device 105 and/or the software application 117. The display screen 700C further comprises a detailed alert display screen 725 with information related to the alert. By activating a "Print" icon 727 on the detailed alert display screen 725, the device user 145 can print a hard copy of the contents of the detailed alert display screen 725.

The display screen 700C further comprises a "Help" icon 723 that the device user 145 can activate to request performance support content related to the device 105 and/or the software application 117. For example, the device user 145 can activate the "Help" icon 723 to receive performance support content related to the alert and/or the detailed alert display screen 725.

Activation of the "Help" icon 723 can prompt the content requestor 120 of the device 105 to transmit a request comprising context information related to the display screen 700C, the alert display screen 720, and/or the detailed alert display screen 725 to the content publisher 135. For example, the context information can comprise a name or other identifying indicia of the display screen 700C, the alert display screen 720, and/or the detailed alert display screen 725. In response to the request, the content publisher 135 can have performance support content responsive to the request displayed on the display 110 of the device 105 and/or the workstation display 150. By including context information related to the display screen 700C, the alert display screen 720, and/or the detailed alert display screen 725 in the request, the content publisher 135 can identify and display performance support content that is context-specific to the device user's particular actions and needs at the time of the request.

FIG. 7D comprises an alternative exemplary display screen 700D, which can be displayed upon activation of the "Help" icon 723 on the display screen 700C of FIG. 7C. The display screen 700D comprises a display screen of the software application 117 and a help display screen 729 with performance support content. The performance support content comprises information that is context-specific to the device user's particular actions and needs at the time he activated the "Help" icon 723. For example, the performance support content can comprise information related to the display screen 700C, the alert of the alert display screen 720, and/or the detailed alert display screen 725 of the display screen 700C of FIG. 7C.

The performance support content of the exemplary help display screen 729 of FIG. 7D comprises a brief overview of a procedure for loading a reagent cartridge in response to the alert of the alert display screen 720 of FIG. 7C. The brief overview includes abbreviated instructions for performing the procedure. For example, the brief overview can serve as a quick "reminder" of the steps required to perform the procedure for an experienced device user 145.

To obtain more details related to the performance support content of the help display screen 729, the device user 145 can activate a "More Detail" icon 730. For example, the device user 145 can activate the "More Detail" icon 730 to obtain more detailed information regarding a particular step of the procedure described in the help display screen 729. Such detailed information can be particularly helpful for a less experienced device user 145 performing an unfamiliar task.

Activation of the "More Detail" icon 730 can prompt the content requester 120 of the device 105 to transmit a request comprising context information related to the display screen 700D, the alert display screen 720, the detailed alert display screen 725, and/or the help display screen 729 to the content publisher 135. For example, the context information can comprise a name or other identifying indicia of the display screen 700D, the alert display screen 720, the detailed alert display screen 725, and/or the help display screen 729. In response to the request, the content publisher 135 can have performance support content responsive to the request displayed on the display 110 of the device 105 and/or the workstation display 150. By including context information related to the display screen 700D, the alert display screen 720, the detailed alert display screen 725, and/or the help display screen 729 in the request, the content publisher 135 can identify and display performance support content that is context-specific to the device user's particular actions and needs at the time of the request.

FIG. 7E comprises an alternative exemplary display screen 700E, which can be displayed upon activation of the "More Detail" icon 730 on the help display screen 729 of FIG. 7D. The display screen 700D comprises a display screen of the software application 117 and a detailed help display screen 737 with performance support content. The performance support content comprises information that is context-specific to the device user's particular actions and needs at the time he activated the "More Detail" icon 730. For example, the performance support content can comprise information related to the display screen 700D, the alert display screen 720, the detailed alert display screen 725, and/or the help display screen 729 of FIG. 7D.

The performance support content of the exemplary detailed help display screen 737 of FIG. 7E comprises a comprehensive outline of a procedure for loading a reagent cartridge. The comprehensive outline provides a more in-depth overview of the procedure than the brief overview provided in the help display screen 729. For example, the comprehensive procedure outline can help a less experienced device user 145 perform the procedure. The detailed help display screen 737 comprises an image 735 illustrating how to perform one or more steps of the procedure.

FIG. 7F comprises an alternative exemplary display screen 700F, which can be displayed upon activation of the "Help" icon 723 on the display screen 700A of FIG. 7A. The display screen 700F comprises a display screen of the software application 117 and a screen description display screen 736 with performance support content. The performance support content comprises information that is context-specific to the device user's particular actions and needs at the time he activated the "Help" icon 723. For example, the performance support content can comprise information related to the display screen 700A of FIG. 7A.

The performance support content of the exemplary screen description display screen 736 of FIG. 7F comprises a brief overview of the information displayed on the display screen 700A and the procedures the device user 145 can perform in connection with the display screen 700A. The screen description display screen 736 includes a set of links 734 the device user 145 can activate to obtain additional performance support content related to the display screen 700A and/or the device 105. For example, the device user 145 can activate a "Replace V-Lyte Multisensor" link 734B to review performance support content related to a procedure for replacing a V-Lyte Multisensor of the device 105.

Activation of the "Replace V-Lyte Multisensor" link 734B can prompt the content requestor 120 of the device 105 to transmit a request comprising context information related to the display screen 700F, the screen description display screen 736, and/or the "Replace V-Lyte Multisensor" link 734B to the content publisher 135. For example, the context information can comprise a name or other identifying indicia of the display screen 700F, the screen description display screen 736, and/or the "Replace V-Lyte Multisensor" link 734B. In response to the request, the content publisher 135 can have performance support content responsive to the request displayed on the display 110 of the device 105 and/or the workstation display 150. By including context information related to the display screen 700F, the screen description display screen 736, and/or the "Replace V-Lyte Multisensor" link 734B in the request, the content publisher 135 can identify and display performance support content that is context-specific to the device user's particular actions and needs at the time of the request.

The screen description display screen 736 further comprises a "Related Topics" icon 739 the device user 145 can activate to view additional performance support content related to the display screen 700F and/or the device 105. For example, if the information displayed in the screen description display screen 736 is not directly relevant to a particular question or need of the device user 145, the device user 145 can activate the "Related Topics" icon 737 to review other information that may be more relevant to his question/need. As with activation of the "Replace V-Lyte Multisensor" link 734B described above, activation of the "Related Topics" icon 739 can prompt the content requestor 120 of the device 105 to transmit a request comprising context information related to the display screen 700F and/or the screen description display screen 736 to the content publisher 135.

Figure 7G:
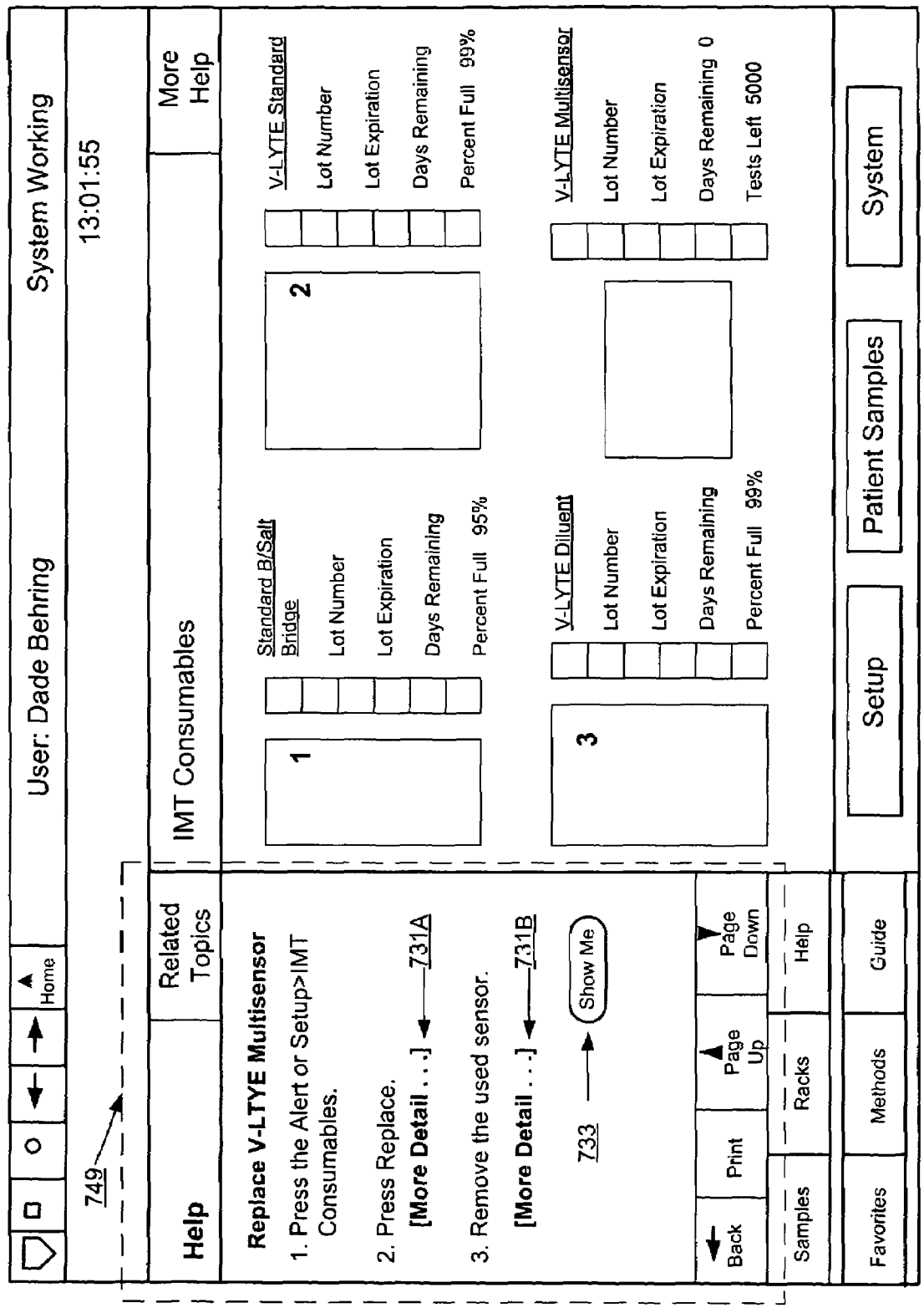

FIG. 7G comprises an alternative exemplary display screen 700G, which can be displayed upon activation of the "Replace V-Lyte Multisensor" link 734B on the display screen 700F of FIG. 7F. The display screen 700G comprises a display screen of the software application 117 and a help display screen 749 with performance support content. The performance support content comprises information that is context-specific to the device user's particular actions and needs at the time he activated the "Replace V-Lyte Multisensor" link 734B. For example, the performance support content can comprise information related to the display screen 700F, the screen description display screen 736, and/or the "Replace V-Lyte Multisensor" link 734B of FIG. 7F.

The performance support content of the exemplary help display screen 749 of FIG. 7G comprises a brief overview of a procedure for replacing a V-Lyte Multisensor. The brief overview includes abbreviated instructions for performing the procedure. For example, the brief overview can serve as a quick "reminder" of the steps required to perform the procedure for an experienced device user 145.

To obtain more details related to the performance support content of the help display screen 749, the device user 145 can activate a "More Detail" icon 731. For example, the device user 145 can activate the "More Detail" icon 731A to obtain more detailed information regarding a particular step of the procedure described in the help display screen 749. Such detailed information can be particularly helpful for a less experienced device user 145 performing an unfamiliar task.

Activation of the "More Detail" icon 731A can prompt the content requestor 120 of the device 105 to transmit a request comprising context information related to the display screen 700G and/or the help display screen 729 to the content publisher 135. For example, the context information can comprise a name or other identifying indicia of the display screen 700G and/or the help display screen 749. In response to the request, the content publisher 135 can have performance support content responsive to the request displayed on the display 110 of the device 105 and/or the workstation display 150. By including context information related to the display screen 700G and/or the help display screen 749 in the request, the content publisher 135 can identify and display performance support content that is context-specific to the device user's particular actions and needs at the time of the request.

The help display screen 749 further comprises a "Show Me" icon 733 the device user 145 can activate to view an animation or video related to the procedure. Such an animation or video can be helpful for both experienced device users 145 seeking abbreviated assistance and less experienced device users 145 seeking comprehensive assistance. As with activation of the "More Detail" icon 731A described above, activation of the "Show Me" icon 733 can prompt the content requestor 120 of the device 105 to transmit a request comprising context information related to the display screen 700G and/or the help display screen 749 to the content publisher 135.

Figure 7H:
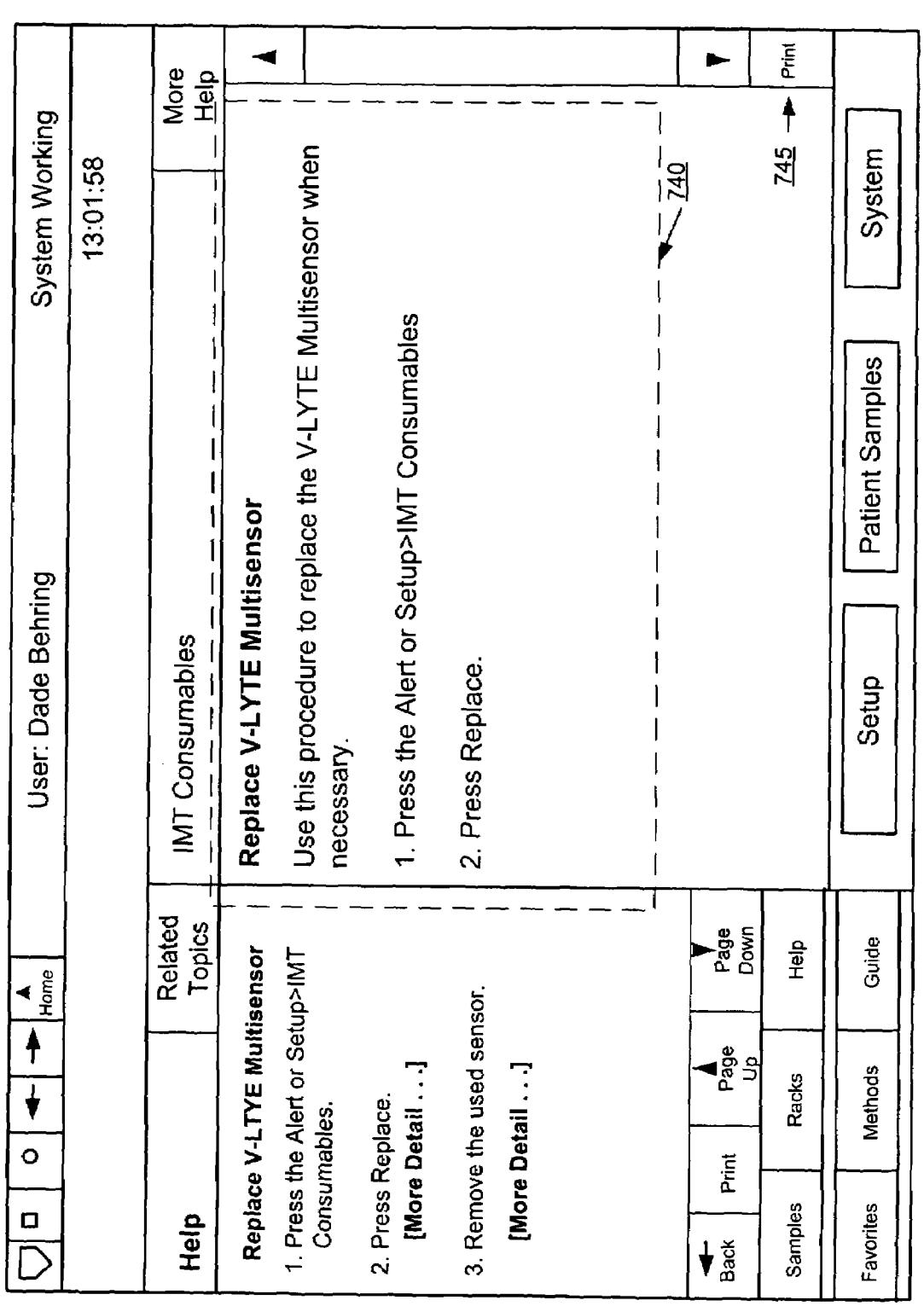

FIG. 7H comprises an alternative exemplary display screen 700H, which can be displayed upon activation of the "More Detail" icon 731A on the help display screen 749 of FIG. 7G. The display screen 700H comprises a display screen of the software application 117 and a detailed help display screen 740 with performance support content. The performance support content comprises information that is context-specific to the device user's particular actions and needs at the time he activated the "More Detail" icon 731A. For example, the performance support content can comprise information related to the display screen 700G and/or the help display screen 749 of FIG. 7G.

The performance support content of the exemplary detailed help display screen 740 of FIG. 7H comprises a comprehensive outline of a procedure for replacing a V-Lyte Multisensor of the device 105. The comprehensive outline provides a more in-depth overview of the procedure than the brief overview provided in the help display screen 749. For example, the comprehensive procedure outline can help a less experienced device user 145 perform the procedure. The device user 145 can print a hard copy of the information displayed in the detailed help display screen 740 by activating a "Print" icon 745.

FIG. 7I comprises an alternative exemplary display screen 700I, which can be displayed upon activation of the "Show Me" icon 733 on the help display screen 749 of FIG. 7G. The display screen 700I comprises a display screen of the software application 117 and an animation display screen 743 with performance support content. The performance support content comprises information that is context-specific to the device user's particular actions and needs at the time he activated the "Show Me" icon 733. For example, the performance support content can comprise information related to the display screen 700G and/or the help display screen 749 of FIG. 7G.

The animation display screen 743 comprises an animation or video related to the procedure described in the help display screen 749. The animation or video can be helpful for both experienced device users 145 seeking abbreviated assistance and less experienced device users 145 seeking comprehensive assistance. For example, the animation or video can illustrate how the device user 145 should perform one or more steps of the described procedure. The device user 145 can traverse the contents of the animation/video by activating a "Play" icon 741A, a "Pause" icon 741B, and/or a "Stop" icon 741C.

Figure 7J:
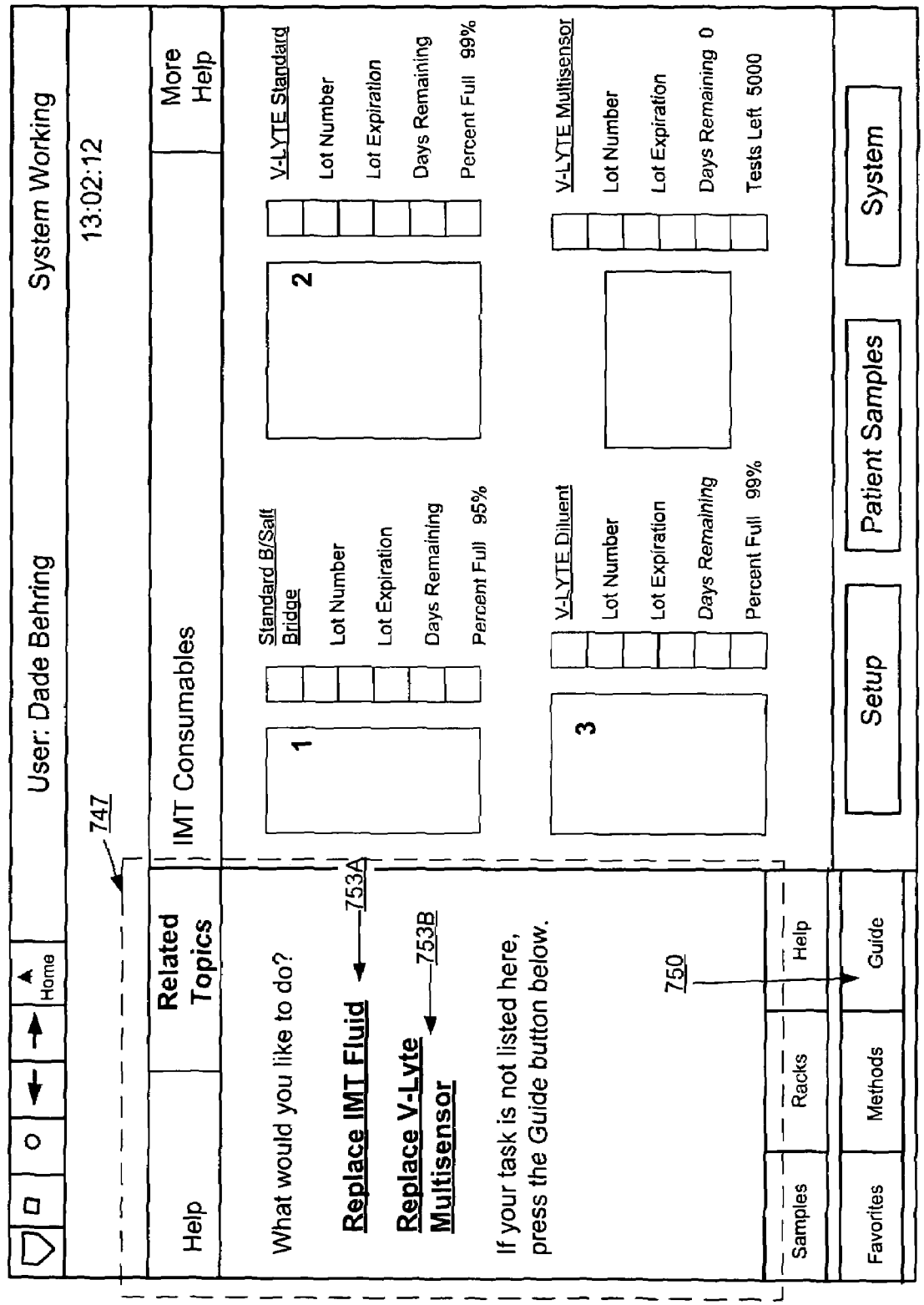

FIG. 7J comprises an alternative exemplary display screen 700J, which can be displayed upon activation of the "Related Topics" icon 739 on the screen description display screen 736 of FIG. 7F. The display screen 700J comprises a display screen of the software application 117 and a related topics display screen 747 with performance support content. The performance support content comprises information that is context-specific to the device user's particular actions and needs at the time he activated the "Related Topics" icon 739. For example, the performance support content can comprise information related to the display screen 700F and/or the screen description display screen 736 of FIG. 7F.

The performance support content of the exemplary related topics display screen 747 comprises a set of links 753 the device user 145 can activate to view additional performance support content. For example, the device user 145 can activate the "Replace V-Lyte Multisensor" link 734B to view the help display screen 749 of FIG. 7G. If none of the links 753 in the related topics display screen 747 is relevant to the device user's questions or needs, the device user 145 can activate a "Guide" icon 750 of the display screen 700J to view an electronic user's guide for the device 105. The device user 145 can search the contents of the user's guide for information relevant to his questions/needs.

The invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A computer-implemented method for providing performance support content for a device, comprising the steps of:
   displaying a first display screen comprising information related to a device;
   receiving a request for performance support content for the device, the request comprising context information related to the first display screen;
   identifying a content file based on the context information, the content file comprising performance support content responsive to the request; and
   displaying a second display screen comprising the performance support content of the identified content file.

2. The method of claim 1, wherein the first display screen comprises an alert related to the device, and wherein the context information comprises information related to the alert.

3. The method of claim 2, wherein the alert comprises one of an instruction to a user of the device and a notification of an error in connection with the device.

4. The method of claim 2, wherein the performance support content displayed on the second display screen comprises instructions for responding to the alert.

5. The method of claim 1, wherein the first display screen comprises information related to a software application of the device.

6. The method of claim 1, wherein the context information comprises a name of the first display screen.

7. The method of claim 6, wherein the step of identifying the content file comprises identifying the content file with the same name as the first display screen.

8. The method of claim 1, further comprising the steps of:
   receiving a second request for performance support content for the device, the second request comprising context information related to the second display screen; and
   displaying a third display screen comprising performance support content responsive to the second request.

9. The method of claim 1, wherein the device is an analytical workstation configured to perform at least one diagnostic procedure in a laboratory setting.

10. A computer-readable medium having computer-executable instructions for performing the steps recited in claim 1.

11. A computer-implemented method for creating performance support content for a device, comprising the steps of:
    creating a performance support file comprising performance support content corresponding to each of a plurality of device alerts and device procedures;
    associating a display screen configured to display information related to the device with at least one of the device alerts and device procedures;
    identifying information in the performance support file regarding the at least one of the device alerts and device procedures associated with the display screen;
    creating a content file comprising the identified information; and
    storing the content file in a data storage medium associated with the device.

12. The method of claim 11, further comprising the step of validating the contents of the performance support file.

13. The method of claim 11, wherein the device alert comprises one of an instruction to a user of the device and a notification of an error in connection with the device.

14. The method of claim 11, wherein the performance support file further comprises information regarding a screen description of each of a plurality of display screens configured to display information related to the device.

15. The method of claim 11, wherein the display screen is a display screen of a software application of the device.

16. The method of claim 11, wherein the device is an analytical workstation configured to perform at least one diagnostic procedure in a laboratory setting.

17. A computer-readable medium having computer-executable instructions for performing the steps recited in claim 11.

18. The method of claim 11, wherein the performance support content corresponding to at least one device alert of the plurality of device alerts and device procedures comprises instructions for responding to the device alert.

19. A system for providing performance support content for a device, comprising:
    a content database comprising the performance support content for the device;
    a content requestor configured to:
       receive a request for the performance support content, and
       transmit context information related to a first display screen displayed on a display associated with the device to a content publisher; and
    the content publisher in communication with the content requestor and the content database and configured to:
       identify a content file comprising the performance support content based on the transmitted context information, and
       display a second display screen comprising the performance support content from the identified content file on the display, in response to the request.

20. The system of claim 19, wherein the device is an analytical workstation configured to perform at least one diagnostic procedure in a laboratory setting.

21. The system of claim 19, wherein the first display screen comprises an alert related to the device, and wherein the context information comprises information related to the alert.

22. The system of claim 21, wherein the alert comprises one of an instruction to a user of the device and a notification of an error in connection with the device.

23. The system of claim 19, wherein the first display screen comprises information related to a software application of the device.

24. The system of claim 19, wherein the context information comprises a name of the first display screen.

* * * * *